H. J. Johnson,
Swinging Gate
N°69,443.    Patented Oct. 1, 1867.

Witnesses:
Theo Tusske
W. Srewrn

Inventor:
H. J. Johnson
Per Munn &c
Attorneys

United States Patent Office.

HANS J. JOHNSON, OF ST. PETER, MINNESOTA.

*Letters Patent No. 69,443, dated October 1, 1867.*

---

IMPROVEMENT IN GATES.

---

*The Schedule referred to in these Letters Patent and making part of the same.*

---

TO ALL WHOM IT MAY CONCERN:

Be it known that I, HANS J. JOHNSON, of St. Peter, in the county of Nicollett, and State of Minnesota, have invented a new and improved Gate; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish a durable and convenient gate, which may be used as a single or double gate, and which may be easily adjusted so as to swing over snow or other obstructions; and it consists in the combination of the parts by which the gate is hinged to the rear gate-post and held at any desired elevation; in the combination of the double-jointed hinges, cogged segments, and spring by which the parts of the gate are connected to each other; and in the combination of the spring, lever, lever-plates, and catches with each other for holding the gate closed at any elevation; the whole being constructed and arranged as hereinafter more fully described.

Figure 1:
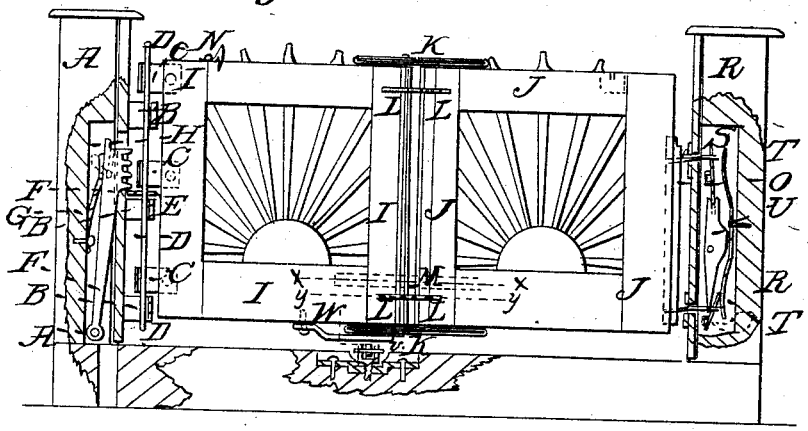
Figure 1 is a side view of my improved gate, parts being broken away to show the construction.
Figure 2:
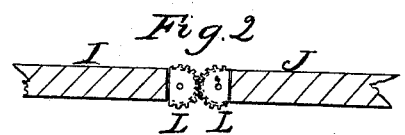
Figure 2 is a detail section taken through the line *y y*, fig. 1.
Figure 3:
Figure 3 is a detail section taken through the line *x x*, fig. 1.
Figure 4:
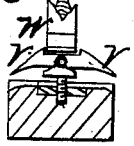
Figure 4 is a detail section taken through the line *z z*, fig. 1.

A is the rear gate-post, to the front of which are attached loops or eyes B, through which, and through the loops or eyes C attached to the gate, passes a rod, D, hinging the gate to the post. E is a plate secured to the rod D in a horizontal position, so that its rear edge may slide up and down along the face of the post A. F is a rack-plate placed in a recess formed in the post A, to which its lower end is pivoted. The plate F has notches or teeth formed upon the upper part of its forward edge, which project through a slot in the face of the post A to take hold of the edge of the plate E to hold the gate at any desired elevation. The plate F is held forward by the spring G, one end of which is secured to the post A, and the other or free end presses against the rear edge of the said plate F. H is a lever passing through the post A, and having its middle part bent or formed into a loop or double crank which rests in a notch or upon a shoulder formed in the upper end of the plate E. One or both the projecting ends of the lever H are bent over, as shown in dotted lines in fig. 1, so that the said lever may be conveniently operated to remove the teeth of the plate F from the edge of the plate E, allowing the gate to be easily and quickly raised or lowered. The gate is made in two parts, I and J, which are connected to each other by double-jointed hinges K, which are formed by pivoting the ends of a short connecting-plate to two ears or plates attached to the upper and lower edges of the parts of the gate, as shown in fig. 1. In the adjacent edges of the parts I and J are secured toothed segments L, the teeth of which mesh into each other so as to hold the post J always in a vertical position when swinging. M is a spring, the ends of which enter and are secured in sockets formed or inserted in the frame of the parts of the gate, as shown in fig. 3, and in dotted lines in fig. 1. The spring M, by its elasticity, makes the part J of the gate self-closing. When desired, the part J may be turned back so as to be parallel with the part I, in which position it may be secured by the spring-catch N taking hold of a suitable catch attached to the upper edge of the part J, as shown in fig. 1. O is a plate or bar attached to the forward edge of the part J of the gate in a vertical position, so that however much or little the gate may be raised the plate O may always be in a position for the catch-plate or plates P to take hold of it. The catch-plates P pass in through slots in the face of the post R, and their inner ends are pivoted to the upper ends of the lever-plates S, the arms of which pass out through the sides of the post R, and have handles formed upon or attached to them, by means of which the said lever-plates may be operated to withdraw the catch-plates to open the gate. The catch-plates P are held forward by the spring T, the middle part of which is secured to the post R, and the ends of which press against the inner ends of the said catch-plates. The lever-plates S are connected to each other, so that the catch-plates P may both move together when either lever-plate is operated to open the gate by the lever U, the upper end of which is pivoted to the lower end of the upper lever-plate, and the lower end of which is pivoted to the upper end of the lower lever-plate, as shown in fig. 1. V is an adjustable catch, the shank of which screws into a nut secured to the bed-plate of the gateway, or to a short post set in the ground, so that the said catch V may be raised or lowered according to the elevation at which the gate is adjusted. The catch V takes hold of a plate, W, attached to the forward part of the lower edge of the part I of the gate, to hold it stationary while the part J of the gate is being used as a single gate.

I claim as new, and desire to secure by Letters Patent—

1. The combination of the spring G, toothed plate F, bent lever H, plate E, rod D, and loops or eyes B and C with each other and with the post A and rear end of the part I of the gate, substantially as herein shown and described and for the purpose set forth.

2. The combination of the double-jointed hinges K, toothed segments L, and spring M with each other and with the adjacent edges of the parts I and J of the gate, substantially as herein shown and described and for the purpose set forth.

3. The combination of the adjustable catch V with the lower edge of the part I of the gate, substantially as herein shown and described and for the purpose set forth.

4. The combination of the catch-plates P, lever-plates S, spring T, and lever U with each other and with the post R and plate or bar O attached to the forward edge of the part J of the gate, substantially as herein shown and described and for the purpose set forth.

HANS J. JOHNSON.

Witnesses:
   WILSON C. BROWN,
   WM. G. HAYDEN.